United States Patent [19]

Bowles et al.

[11] Patent Number: 5,359,717
[45] Date of Patent: Oct. 25, 1994

[54] MICROPROCESSOR ARRANGED TO ACCESS A NON-MULTIPLEXED INTERFACE OR A MULTIPLEXED PERIPHERAL INTERFACE

[75] Inventors: James E. Bowles; Robert O'Brien, both of Austin, Tex.

[73] Assignee: Advanced Micro Devices, Inc., Sunnyvale, Calif.

[21] Appl. No.: 176,281

[22] Filed: Dec. 29, 1993

Related U.S. Application Data

[63] Continuation of Ser. No. 713,874, Jun. 12, 1991, abandoned.

[51] Int. Cl.⁵ .................. G06F 13/00; G06F 13/40; G11C 7/00
[52] U.S. Cl. .............................. 395/325; 365/189.02; 365/230.02; 364/232.8; 364/232.9; 364/238; 364/240; 364/240.5; 364/DIG. 1
[58] Field of Search ............... 395/275, 800, 500, 325; 370/77; 365/189.02, 230.02

[56] References Cited

U.S. PATENT DOCUMENTS

| | | | |
|---|---|---|---|
| 4,590,556 | 5/1986 | Berger et al. | 364/200 |
| 4,613,953 | 9/1986 | Bush et al. | 364/900 |
| 4,626,985 | 12/1986 | Briggs | 364/200 |
| 4,641,261 | 2/1987 | Dwyer et al. | 395/275 |
| 4,716,527 | 12/1987 | Graciotti | 364/200 |
| 4,720,784 | 1/1988 | Radhakrishnan et al. | 364/200 |
| 4,831,514 | 5/1989 | Turlakov et al. | 364/200 |
| 4,860,198 | 8/1989 | Takenaka | 364/200 |
| 4,933,846 | 6/1990 | Humphrey et al. | 364/200 |
| 4,991,170 | 2/1991 | Kem | 370/85.1 |
| 5,014,236 | 5/1991 | Pogorzelski et al. | 364/900 |
| 5,048,012 | 9/1991 | Gulick et al. | 370/77 |
| 5,086,407 | 2/1992 | McGarity et al. | 395/800 |
| 5,113,369 | 5/1992 | Kinoshita | 395/325 |
| 5,262,991 | 11/1993 | Pope | 365/189.02 |
| 5,293,562 | 3/1994 | Pope | 365/189.02 |

*Primary Examiner*—Gopal C. Ray
*Attorney, Agent, or Firm*—Foley & Lardner

[57] ABSTRACT

A bus interface for use in a processing system of the type including a processor such as a microprocessor or a microcontroller permits the processor to access either a non-multiplexed peripheral interface or a multiplexed peripheral interface, wherein the non-multiplexed peripheral interface includes an upper address input, a lower address input, and a data port, wherein the multiplexed peripheral interface includes a multiplexed address and data port, and wherein the processing device includes an internal upper address bus, an internal lower address bus, and an internal data bus. The bus interface includes an external upper address bus coupled to the upper address input, an external lower address bus coupled to the lower address input, and an external address/data bus coupled to the data port and to the multiplexed address and data port. The bus interface further includes bus interface circuit for coupling during an access to the non-multiplexed peripheral interface by the processor, the internal upper address bus to the external upper address bus, the internal lower address bus to the external lower address bus, and the internal data bus to the external address/data bus. During an access to the multiplexed peripheral interface by the processor, the bus interface circuit couples first the internal lower address bus to the external address/data bus and thereafter, the internal data bus to the external address/data bus.

24 Claims, 6 Drawing Sheets

MICROPROCESSOR ARRANGED TO ACCESS A NON-MULTIPLEXED INTERFACE OR A MULTIPLEXED PERIPHERAL INTERFACE

This is a continuation of application Ser. No. 07/713,874, filed Jun. 12, 1991, abandoned.

BACKGROUND OF THE INVENTION

The present invention generally relates to a processing system wherein the processing system includes a peripheral device having a non-multiplexed interface and/or a peripheral device having a multiplexed interface. The present invention more particularly relates to a bus interface for use in a processing system of the time including a processor, such as a microprocessor or a microcontroller, to permit the processor to access either a non-multiplexed peripheral interface or a multiplexed peripheral interface without requiring additional external hardware to achieve both types of accesses.

In early processing systems, operating speed was not a critical requirement. As a result, the microprocessors of such early processing systems were arranged to operate in association with peripheral devices which included multiplexed interfaces. With such multiplexed interfaces, only eight external pins were required of the microprocessor for providing addresses and data during an access of the multiplexed peripheral interfaces. During a first phase of such an access, an eight-bit address is first provided from the eight pins to access, for example, a peripheral device internal register. When the eight-bit address is held by the processor, a latch within the multiplexed peripheral interface latches the eight-bit address responsive to an address latch enable signal from the microprocessor. After the eight-bit address is latched, and during a second access phase, either the microprocessor provides eight bits of data over the same eight pins for a write access or receives eight bits of data at the same eight pins from the multiplexed peripheral for a read access.

In more recent processing systems, operating speed has become a critical requirement. As a result, the microprocessors of such recent processing systems are arranged to operate in association with fast operating peripheral devices, such as memories, having non-multiplexed interfaces. These peripherals generally require addresses having sixteen bits and, by having non-multiplexed interfaces, are arranged to receive a sixteen bit address and to receive, for a write access, or provide, for a read access, eight bits of data during the same access phase. As a result, non-multiplexed peripheral devices can be accessed at a faster rate than multiplexed peripherals, although in accessing such non-multiplexed peripherals, twenty-four external pins are required of the processor for the addresses and data.

Since multiplexed peripheral devices have been in use for some time, their multiplexed configurations have become standardized. As a result, processing systems are often required to incorporate both multiplexed peripheral devices and non-multiplexed peripheral devices and provide the hardware necessary to permit the microprocessors of these systems to access both types of peripheral devices.

To that end, microprocessors are generally arranged for accessing only non-multiplexed peripheral interfaces and therefore, the processing systems require additional hardware, such as controllers external to the microprocessors, to permit accesses to multiplexed peripheral interfaces. This introduces intervening hardware which increases the cost of processing systems employing such hardware.

SUMMARY OF THE INVENTION

The present invention provides a bus interface for use in a processing system of the type including a processor such as a microprocessor or a microcontroller to permit the processor to access either a non-multiplexed peripheral interface or a multiplexed peripheral interface, wherein the non-multiplex peripheral interface includes an upper address input, a lower address input, and a data port, and wherein the multiplex peripheral interface includes a multiplexed address and data port. The processing device includes an internal upper address bus, an internal lower address bus, and an internal data bus. The bus interface includes an external upper address bus coupled to the upper address input, an external lower address bus coupled to the lower address input, and an external address/data bus coupled to the data port and to the multiplexed address and data port. The bus interface further includes bus interface means for coupling, during an access to the non-multiplexed peripheral interface by the processor, the internal upper address bus to the external upper address bus, the internal lower address bus to the external lower address bus, and the internal data bus to the external address/data bus, and for coupling, during an access to the multiplexed peripheral interface by the processor, first, the internal lower address bus to the external address/data bus and then, the internal data bus to the external address/data bus.

The present invention further provides a microprocessor arranged to access either a non-multiplexed peripheral interface or a multiplexed peripheral interface, wherein the non-multiplexed peripheral interface includes an upper address input, a lower address input, and a data port, and wherein the multiplexed peripheral interface includes a multiplexed address and data port. The microprocessor includes an internal upper address bus, an internal lower address bus, and an internal data bus. The microprocessor further includes bus interface means for coupling, during an access of the non-multiplexed peripheral interface by the processor, the internal upper address bus to the upper address input, the internal lower address bus to the lower address input, and the internal data bus to the data port of the non-multiplexed peripheral interface, and for coupling, during an access of the multiplexed peripheral interface by the microprocessor, first, the internal lower address bus to the multiplexed port and thereafter, the internal data bus to the multiplexed port.

The present invention still further provides a processing system including a microprocessor, a non-multiplexed peripheral interface, and a multiplexed peripheral interface. The microprocessor includes selective accessing means for accessing either the non-multiplexed peripheral interface or the multiplexed peripheral interface.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, and the several figures of which like reference numerals identify identical elements, and wherein:

DETAILED DESCRIPTION OF THE PREFERRED EMBODIMENT

Figure 1:
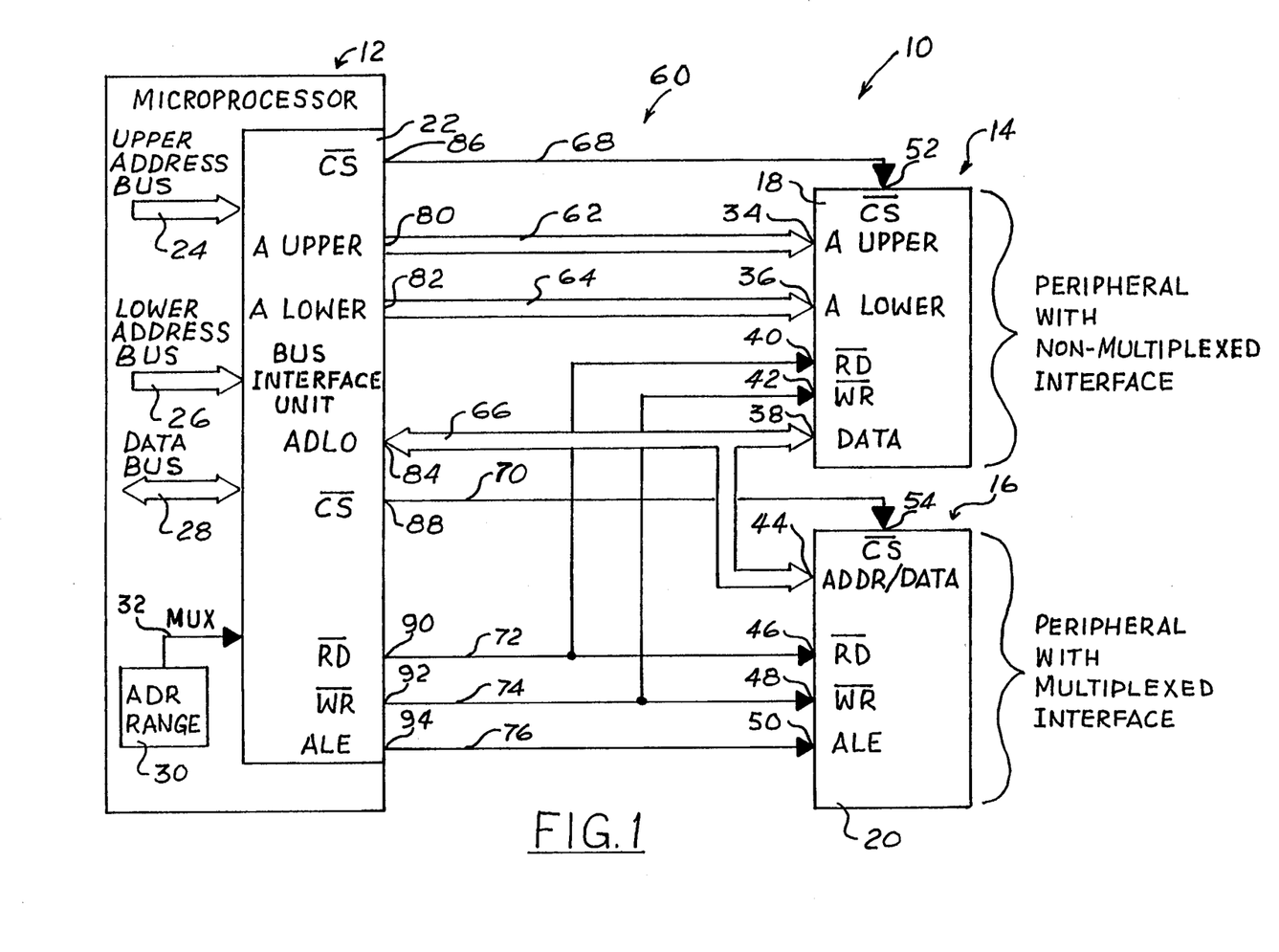
FIG. 1 is a block diagram of a processing system embodying the present invention.

Referring now to FIG. 1, it illustrates a processing system 10 embodying the present invention. The processing system 10 generally includes a microprocessor 12, a first peripheral device 14 and a second peripheral device 16. The first peripheral device 14 includes a non-multiplexed peripheral interface 18 and the second peripheral device 16 includes a multiplexed peripheral interface 20.

Although the processing system 10 is illustrated as including a microprocessor 12, it will be understood by those skilled in the art, that the present invention relates equally as well to a processing system of the type including a microcontroller in place of the microprocessor 12 without departing from the present invention. In addition, only one non-multiplexed peripheral device 14 and only one multiplexed peripheral device 16 are illustrated in FIG. 1 but additional such devices may be included, as will be appreciated by those skilled in the art, without departing from the present invention.

The microprocessor 12 includes a bus interface unit 22 embodying the present invention. The bus interface unit 22, in accordance with this preferred embodiment, is integrated within the same integrated circuit along with the microprocessor 12. However, the bus interface unit 22 may be external to the microprocessor 12 on a separate integrated circuit without departing from the present invention.

The microprocessor 12 also includes an internal upper address bus 24, and internal lower address bus 26, and a data bus 28. When the microprocessor 12 provides the eight-bit addresses over the internal upper address bus 24 and the internal lower address bus 26, during the same access cycle, it will provide over the internal data bus 28, for a write access, eight bits of data or will receive, from the non-multiplexed interface 14, eight bits of data onto the internal data bus 28 during a read access.

The microprocessor 12 further includes an address range control 30 which has stored therein address ranges. The address range control 30 receives the upper and lower addresses from the upper address bus 24 and the lower address bus 26 and determines whether the non-multiplexed device 14 or the multiplexed device 16 is being addressed by the microprocessor 12. The address range control 30 provides a control signal over control line 32 for conditioning the bus interface unit 22 to selectively couple the microprocessor 12 to either the non-multiplexed device 14 or the multiplexed device 16 depending upon the address provided by the microprocessor 12.

The non-multiplexed peripheral interface 18 includes an upper address input 34, a lower address input 36, and a data port 38. The term "port" is used herein to denote a bi-directional input wherein data is either received or outputed.

The non-multiplexed interface 18 further includes a read control input 40 and a write control input 42 which receive from the bus interface unit 22 active low read or write control signals to indicate whether the access to the non-multiplexed peripheral device 14 is a read or a write access respectively. The non-multiplexed peripheral device 14 may be, for example, a memory which requires a sixteen-bit address and which either receives or provides eight bits of data at the data port 38.

The multiplexed peripheral interface includes a multiplexed address and data port 44, a read control input 46, a write control input 48, and an address latch enable input 50. As will be seen hereinafter, when the multiplexed peripheral device 16 is accessed by the microprocessor 12, the access requires a first phase and a second phase wherein during the first phase, an eight-bit address for an internal register within the multiplexed peripheral device 16 is provided at port 44 and, while the address is held at port 44 by the microprocessor 12, the bus interface unit 22 provides an address latch enable signal to input 50 which causes the multiplexed peripheral interface 20 to latch the address provided at port 44. During the second phase of the access, the microprocessor through the bus interface unit 22 provides eight bits of data to the port 44 for a write access or receives eight bits of data from the port 44 for a read access.

Each of the peripheral interfaces 18 and 20 further includes a chip select input 52 and 54 respectively. When the non-multiplexed peripheral device 14 is being accessed by the microprocessor 12, the bus interface unit 22 provides an active low signal to the chip select input 52 of the non-multiplexed peripheral device 14. Similarly, when the microprocessor 12 is accessing the multiplexed peripheral device 16, the bus interface unit 22 will provide an active low chip select signal to input 54 of the multiplexed peripheral interface 20.

The processing system 10 further includes a bus interface means 60 which includes the bus interface unit 22 and an external upper address bus 62, an external lower address bus 64, an external address/data bus 66, and control lines 68, 70, 72, 74, and 76. The external upper address bus 62 is an eight-bit bus which is coupled to the upper address input 34. The external lower address bus 64 is an eight-bit bus which is coupled to the lower address input 36. The external address/data bus 66 is an eight-bit bus which is coupled to the data port 38 and to the multiplexed address/data port 44. The control lines 68 and 70 provide the chip select signals for the non-multiplexed peripheral interface 14 and the multiplexed peripheral interface 16 respectively. The control lines 72 and 74 provide the read and write control signals respectively and the control line 76 provides the address latch enable control signal.

The bus interface unit 22 includes a first output 80 coupled to the external upper address bus 62, a second output 82 coupled to the external lower address bus 64, and a port 84 coupled to the external address/data bus 66. The bus interface unit 22 further includes a first chip select control output 86, a second chip select control output 88, a read control output 90, a write control output 92, and a an address latch enable control output 94. The outputs 86 and 88 provide the active low chip select control signals. Output 90 provides the read control signal, output 92 provides the write control signal, and output 94 provides the address latch enable control signal.

The bus interface unit 22 is coupled to the internal upper address bus 24, the lower address bus 26, and the internal data bus 28. As will be seen hereinafter, when the microprocessor 12 accesses the non multiplexed peripheral device 14, the bus interface unit 22 couples the internal upper address bus 24 to the upper address input 34 through the external upper address bus 62, the internal lower address bus 26 to the lower address input 36 through the external lower address bus 64, and the internal data bus 28 to the data port 38 through the external address/data bus 66. When the microprocessor 12 accesses the multiplexed peripheral device 16, the bus interface unit 22 first couples the lower address bus 26 to the multiplexed port 44 through the external address/data bus 66 and thereafter, the internal data bus 28 to the multiplexed port 44 through the external address/data bus 66.

Figure 2:
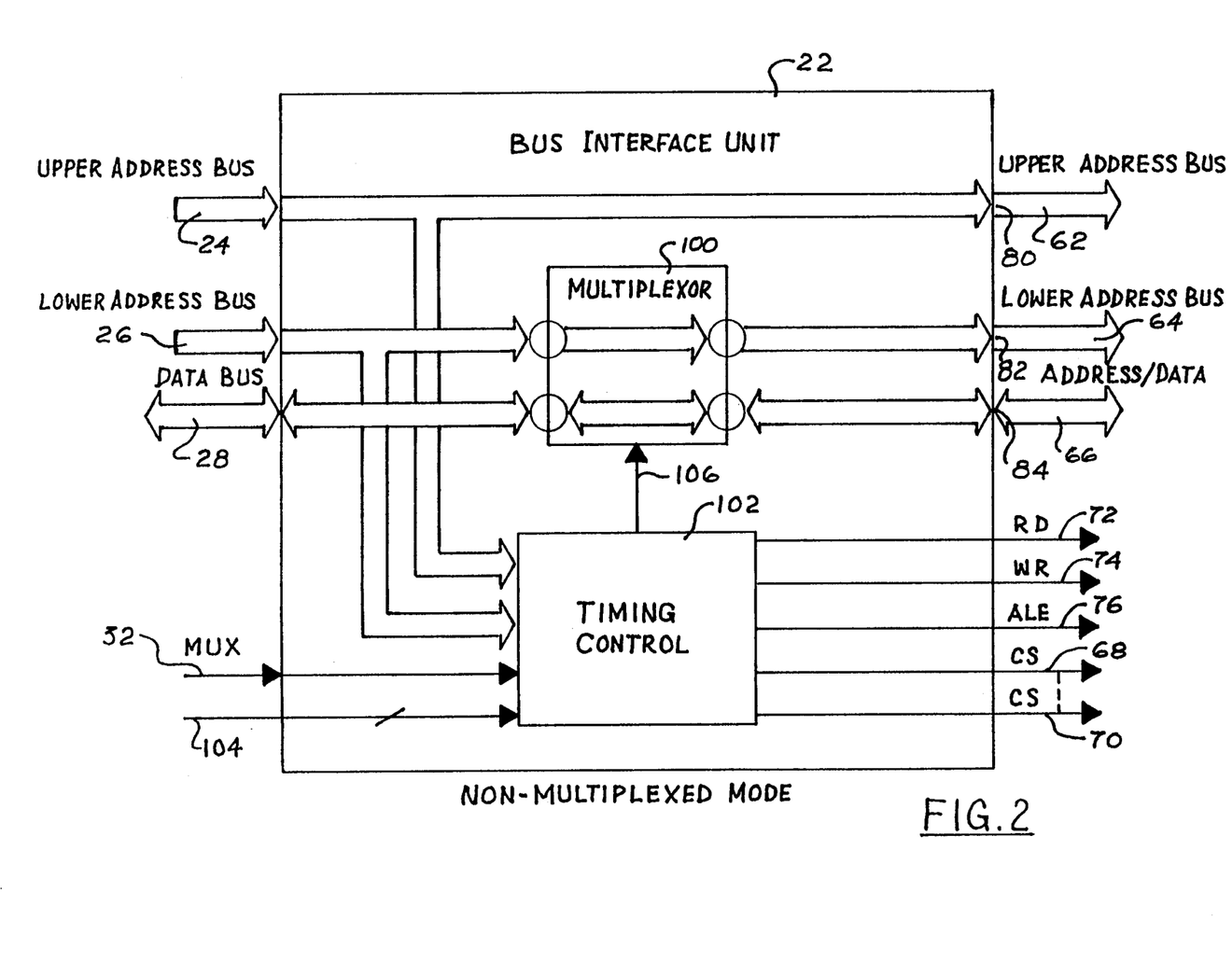
FIG. 2 is a detailed block diagram of the bus interface unit of FIG. 1 selectively configured for providing access to a non-multiplexed interface.
Figure 3:
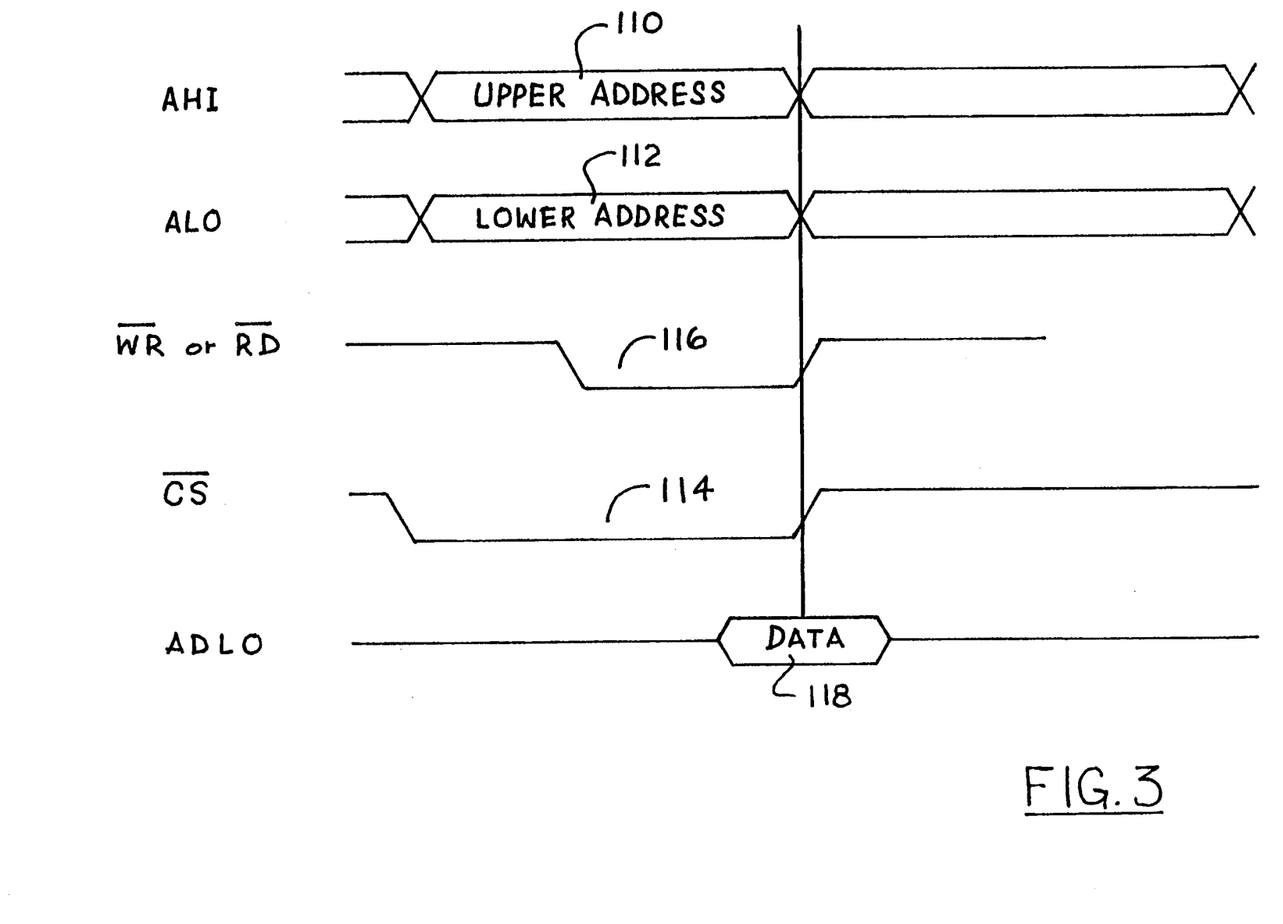
FIG. 3 is a series of wave forms illustrating the manner in which the non-multiplexed interface may be accessed in accordance with the present invention.

Referring now to FIGS. 2 and 3, FIG. 2 illustrates the configuration of the bus interface unit 22 when the microprocessor is accessing the non-multiplexed peripheral device 14 and FIG. 3 illustrates the manner in which the microprocessor 12 may access the non-multiplexed peripheral device 14 through the bus interface unit 22. As will be noted in FIG. 2, the internal upper address bus 24 is coupled to the external upper address bus 62 by the bus interface unit 22. The bus interface unit 22 includes a multiplexer 100 which selectively couples the internal lower address bus 26 to the external lower address bus 64 and the internal data bus 28 to the external address/data bus 66. The selective coupling by the multiplexer 100 is controlled by a timing control means 102. The timing control means is coupled to the internal upper address bus 24 and the internal lower address bus 26. The timing control means 102 is also coupled to the address range controller 30 by the control line 32. The timing control means 102 is also arranged to receive control signals from the microprocessor over a plurality of control lines 104.

The sixteen-bit address provided by the microprocessor 12 on the internal upper address bus 24 and the internal lower address bus 26 causes the timing control means 102 to generate a chip select signal over control line 68 which causes the non-multiplexed peripheral device 14 to be selected. The control signals conveyed to the timing control means 102 over the control lines 104 are utilized by the timing control means 102 to generate either a read control signal on line 72 to indicate a read access or a write control signal on control line 74 to indicate a write access.

The timing control means 102 is coupled to the multiplexer 100 over a control line 106. If the non-multiplexed peripheral device is being accessed by the microprocessor 12, the address range control 30 will determine from the sixteen-bit address that the non-multiplexed peripheral device 14 is being accessed and will provide a control signal over line 32 to cause the timing control means 102 to provide a control signal over line 106 to cause multiplexer 100 to assume the selective configuration illustrated in FIG. 2.

As a result of the foregoing, and as can be seen in FIG. 3, during the access of the non-multiplexed peripheral interface 18, the non-multiplexed peripheral interface 18 is provided with an upper address 110 over the external upper address bus 62, a lower address 112 over the lower external address bus 64, a chip select signal 114 over control line 68, and a read or a write control signal 116 over the control lines 72 or 74 respectively. When the foregoing signals have been established, data 118 is either conveyed from the non-multiplexed peripheral device 14 for a read access or is provided with the data 118 by microprocessor 12 for a write access over the external address/data bus 66.

As can thus be seen, during an access of the non-multiplexed peripheral device 14 by the microprocessor 12, the bus interface means 60 directly couples the internal upper address bus 24 to the upper address input 34 through the first output 80 and the external upper address bus 62, and couples, by the multiplexer 100, the internal lower address bus 26 to the lower address input 36 through the second output 82 and the external lower address bus 64, and the internal data bus 28 to the data port 38 through the port 84 and the external address/data bus 66. The foregoing is accomplished during one processing cycle of the microprocessor 12 as illustrated in FIG. 3.

Figure 4:
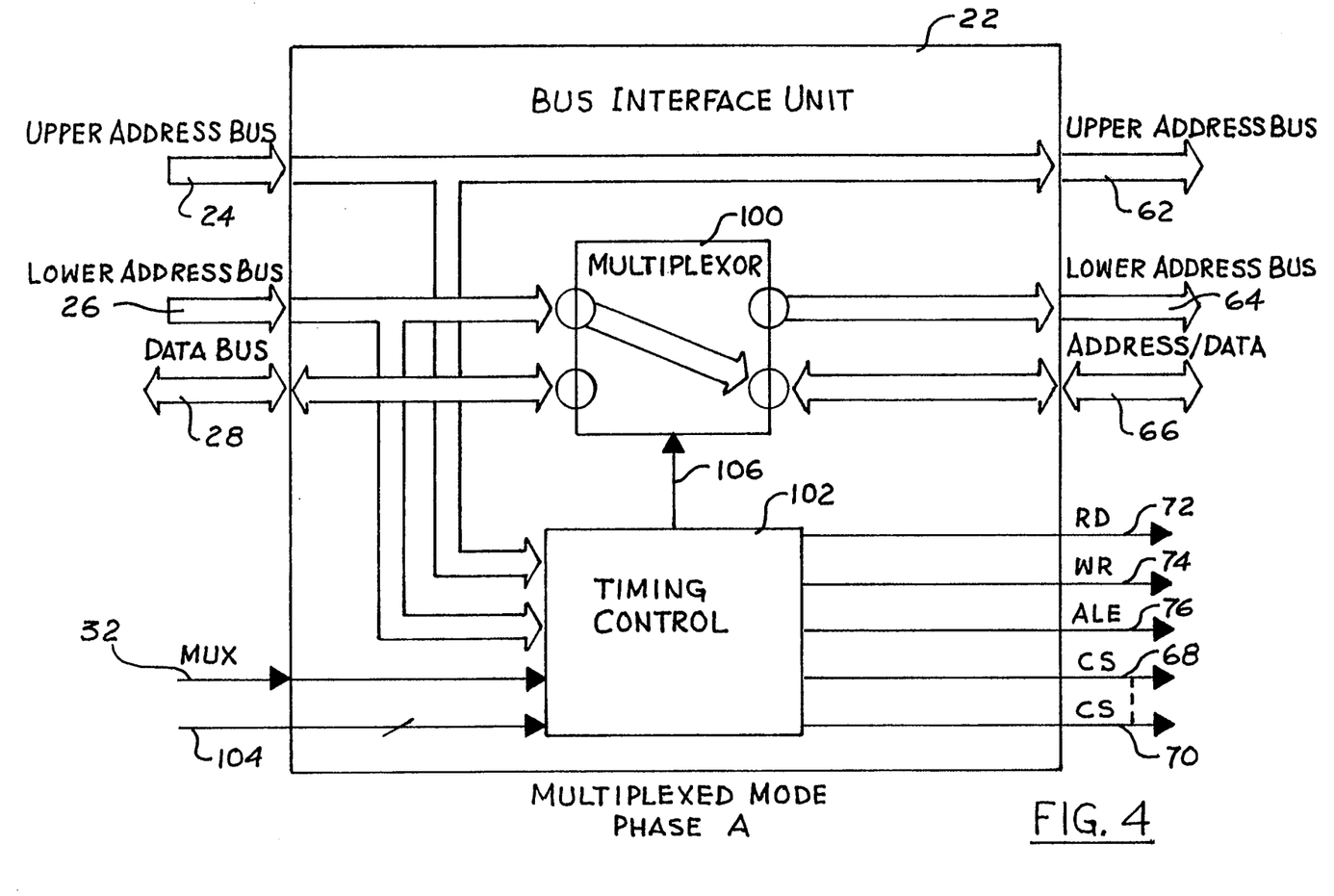
FIG. 4 is a detailed block diagram of the bus interface unit Of FIG. 1 selectively configured for providing access to a multiplexed interface during a first phase of the access.

Referring now to FIG. 4, it illustrates the selective configuration of the bus interface unit 22 when the microprocessor 12 accesses the multiplexed peripheral device 16 during the first phase of the access. The first phase of the access is indicated in FIG. 5 as PHASE A 120.

When the microprocessor accesses the multiplexed peripheral interface 20, the multiplexer 100 first couples the internal lower address bus 26 to the external address/data bus 66 and thus to the multiplexed address and data port 44 of the multiplexed peripheral interface 20. This is accomplished in response to the timing control 102 having received a multiplex enable control signal over control line 32 from the address range control 30. The address range control 30 provides the multiplex enable control signal in response to the address provided by the microprocessor 12 as previously described. In addition, a chip select signal is provided over control line 70 from the timing control means 102 in response to the addresses received over the internal upper address bus 24 and the internal lower address bus 26. The timing control means 102 further provides either a read or a write enable control signal over lines 72 and 74 to condition the multiplexed peripheral device 16 for either a read or a write access respectively responsive to control signals received from the microprocessor over control lines 104.

During the time in which the address provided on the internal lower address bus 26 to the external address/data bus 66 is being held by the microprocessor 12, the timing control means 102 provides the address latch enable control signal 126 over the line 76 to cause the multiplexed peripheral interface 20 to latch the address. The foregoing is illustrated in FIG. 5.

Figure 5:
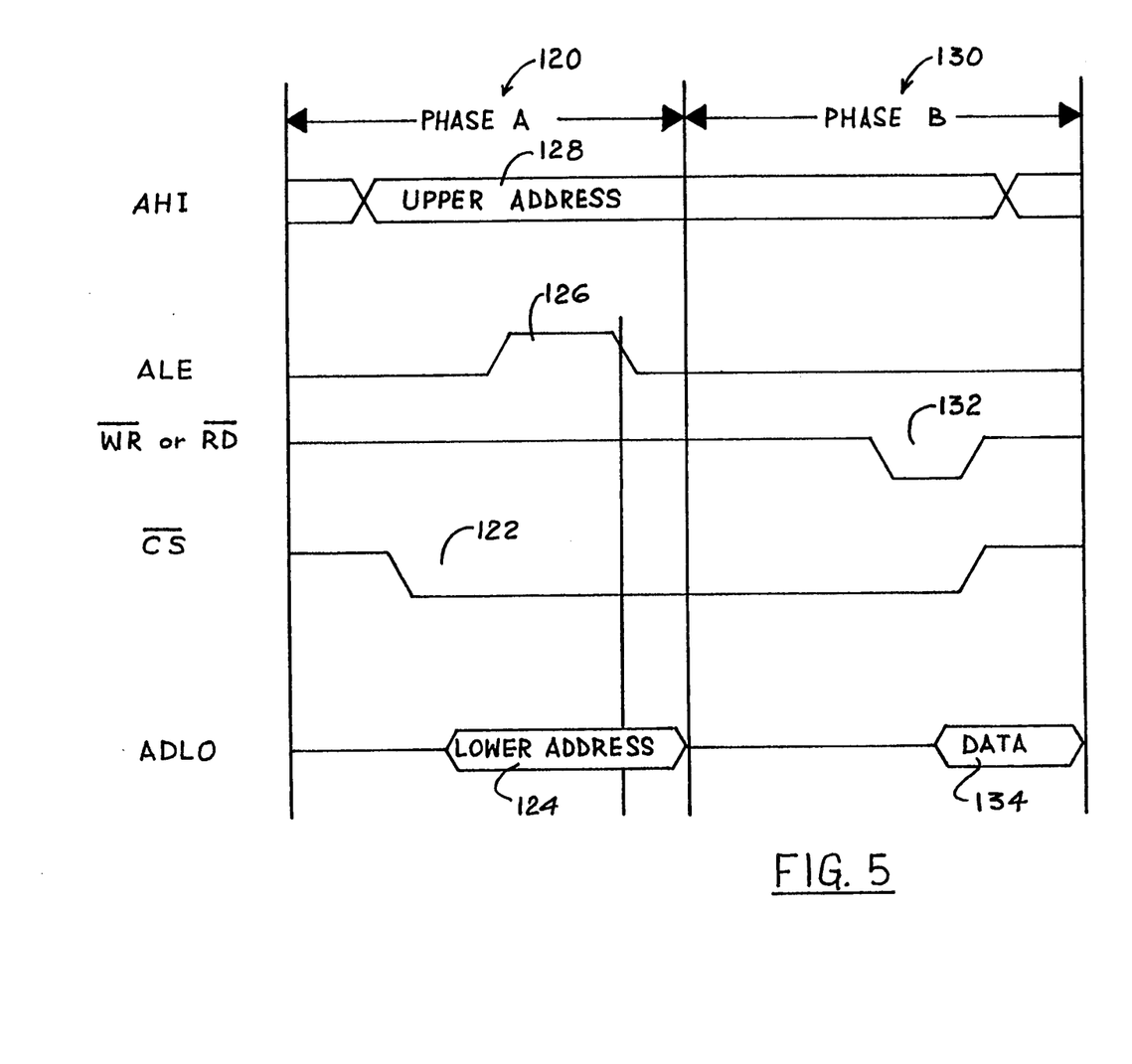
FIG. 5 is a series of wave forms illustrating the manner in which the multiplexed peripheral interface may be accessed during first and second access phases in accordance with the present invention.

Referring now to FIG. 5, it will be noted that during PHASE A 120 of the access cycle, the bus interface unit provides over line 70 the chip select control signal 122. While the address 124 is held over the internal lower address bus 26 and the external address/data bus 66, the bus interface unit 22 provides the address latch enable control signal 126 to cause the multiplexed peripheral interface 20 to latch the address 124. As will be also noted in FIG. 5, the microprocessor provides an upper address 128 during the first and second access phases by convention.

Figure 6:
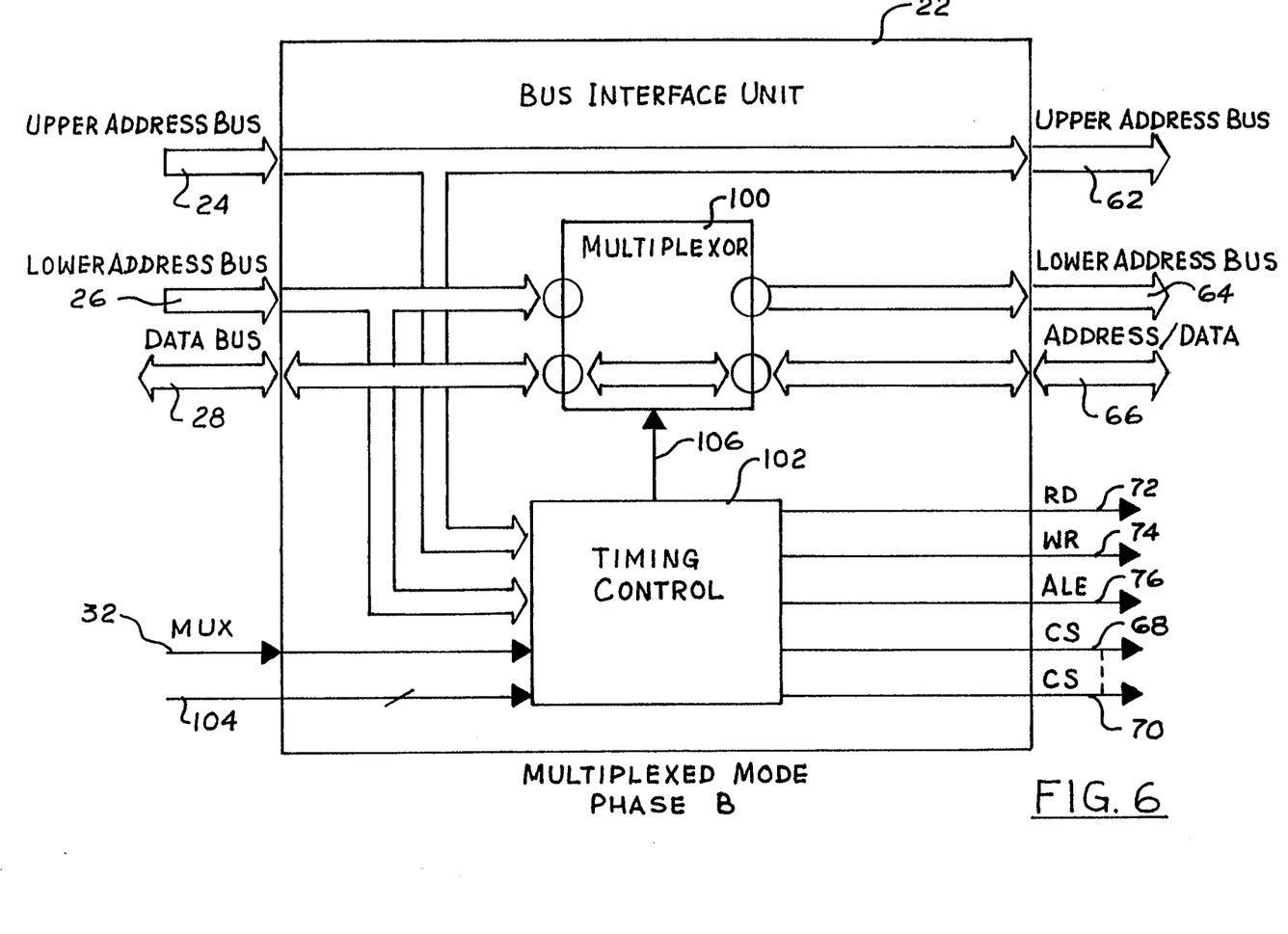
FIG. 6 is a detailed block diagram of the bus interface unit of FIG. 1 selectively configured for providing access to a multiplexed interface during the second phase of the access.

Referring now to FIG. 6, it illustrates the selective configuration of the bus interface unit 22 during the second phase, PHASE B, of the access cycle of the microprocessor 12 of the multiplexed peripheral device 16. The second access phase is indicated at 130 of FIG. 5.

Referring more specifically to FIG. 6, it will be noted that during the second access phase of the multiplexed peripheral device 16, the multiplexer 100 selectively couples the internal data bus 28 to the external address-/data bus 66 and thus to the multiplexed port 44 of the multiplexed peripheral interface 20. The multiplexer 100 provides this selective coupling of the internal data bus 28 to the external address/data bus 66 in response to the timing control means 102.

As will be noted in FIG. 5, the timing control means 102 provides the read or write control signal 132 to condition the multiplexed peripheral device 16 for either a read or a write access respectively. The chip select signal 102 is held active low. With the address being latched by the multiplexed peripheral device interface 20, data 134 is either provided by the multiplexed peripheral device 16 for a read access or is provided with the data 134 by the microprocessor 12 for a write access. For a read access, the data is provided from the multiplexed port 44, over the external address-/data bus 66, and to the port 84 of the bus interface unit 22. For a write access, the data is provided from the port 84, over the external address/data bus 66, and to the multiplexed port 44.

As will be noted in FIG. 5, the access to the multiplexed peripheral device requires two microprocessor processing cycles which includes the first access phase 120 (PHASE A) and the second access phase 130 (PHASE B). Hence, the accessing of the multiplexed peripheral device 16 requires two microprocessor processing cycles.

While a particular embodiment of the present invention has been shown and described, modifications may be made, and it is therefore intended to cover in the appended claims all such changes and modifications which fall within the true spirit and scope of the invention.

What is claimed is:

1. A microprocessor configured for accessing a non-multiplexed peripheral interface and a multiplexed peripheral interface, wherein said non-multiplexed peripheral interface includes an upper address input, a lower address input, and a data port and wherein said multiplexed peripheral interface includes a multiplexed address and data port, said microprocessor comprising:
    an internal upper address bus;
    an internal lower address bus;
    an internal data bus;
    an address range controller, coupled with said internal upper address bus and said internal lower address bus for providing a multiplexer control signal; and
    bus interface means coupled with said address range controller, said bus interface means being responsive to said multiplexer control signal for coupling, during an access of said non-multiplexed peripheral interface by said microprocessor, said internal upper address bus to said upper address input, said internal lower address bus to said lower address input, and said internal data bus to said data port of non-multiplexed peripheral interface, and for coupling, during an access of said multiplexed peripheral interface by said microprocessor, first said internal lower address bus to said multiplexed port and thereafter, said internal data bus to said multiplexed port.

2. A microprocessor as defined in claim 1 wherein said bus interface means includes a first output, a second output, and a port, said first output being coupled by said bus interface means to said upper address input, said second output being arranged to be coupled to said lower address input, and said port being arranged to be coupled to said data port and to said multiplexed port and wherein said bus interface means further includes a multiplexer responsive to said multiplexer control signal for selectively coupling, during said access of said non-multiplexed peripheral interface by said microprocessor, said internal lower address bus to said second output, and said internal data bus to said port, and for selectively coupling, during said access of said multiplexed peripheral interface by said microprocessor, first said internal lower address bus to said port and thereafter said internal data bus to said port.

3. A microprocessor as defined in claim 2 wherein said microprocessor is arranged for providing an upper address on said internal upper address bus and a lower address on said lower address bus, and wherein said bus interface means further comprises timing control means coupled to said internal upper and lower address busses and arranged to be coupled to said non-multiplexed and multiplexed peripheral interfaces for providing peripheral select signals to said peripheral interfaces responsive to said upper and lower addresses provided by said microprocessor.

4. A microprocessor as defined in claim 3 wherein said address range controller provides said multiplexer control signal to said timing control means and wherein said timing control means is coupled to said multiplexer and responsive to said multiplexer control signal for controlling the selective coupling by said multiplexer.

5. A microprocessor as defined in claim 4 wherein said address range controller provides said multiplexer control signal responsive to said upper and lower addresses provided by said microprocessor.

6. A microprocessor as defined in claim 3 wherein said timing control means is arranged to provide said multiplexed peripheral interface with a latch enable signal for permitting said multiplexed peripheral interface to latch the address provided on said internal lower address bus when said internal lower address bus is coupled to said multiplexed port.

7. A microprocessor as defined in claim 3 wherein said timing control means is arranged for providing read or write control signals to said peripheral interfaces for conditioning said peripheral interfaces for a read or write access respectively by said microprocessor.

8. A microprocessor as defined in claim 3 wherein said microprocessor is arranged to provide said upper address on said internal upper address bus containing eight bits and said lower address on said internal lower address bus containing eight bits.

9. A processing system comprising:
    a microprocessor, having an internal address bus and an internal data bus, said microprocessor including an address range controller, coupled to said internal address bus, for providing a multiplexer control signal in response to an address on said internal address bus;

a non-multiplexed peripheral interface;

a multiplexed peripheral interface; and said microprocessor including bus interface means, coupled to said non-multiplexed peripheral interface, to said multiplexed peripheral interface, and to said address range controller, for either coupling said non-multiplexed peripheral interface to said internal address bus and said internal data bus, or for first coupling said multiplexed peripheral interface to said internal address bus and thereafter coupling said multiplexed peripheral interface to said internal data bus in response to said multiplexer control signal.

10. A processing system as defined in claim 9, wherein said non-multiplexed peripheral interface includes an upper address input, a lower address input, and a data port; wherein said multipelxed peripheral interface includes a multiplexed address and data port; and wherein said internal address bus includes an internal upper address bus, and an internal lower address bus, and wherein said bus interface means is responsive to said multiplexer control signal for coupling, during an access of said non-multiplexed peripheral interface by said microprocessor, said internal upper address bus to said upper address input, said internal lower address bus to said lower address input, and said internal data bus to said data port; said bus interface means being responsive to said multiplexer control signal for first coupling, during an access of said multiplexed peripheral interface by said microprocessor, said internal lower address bus to said multiplexed address and data port and thereafter coupling said internal data bus to said multiplexed address and data port.

11. A processing system as defined in claim 10 further including an external upper address bus coupled to said upper address input and to said internal upper address bus by said bus interface means, an external lower address bus coupled to said lower address input, and an external address/data bus coupled to said data port and to said multiplexed port and wherein said bus interface means further includes a multiplexer responsive to said multiplexer control signal for selectively coupling, during said access of said non-multiplexed peripheral interface by said microprocessor, said internal lower address bus to said external lower address bus, and said internal data bus to said external address/data bus, and for selectively coupling, during said access of said multiplexed peripheral interface by said microprocessor, first said internal lower address bus to said external address/data bus and thereafter said internal data bus to said external address/data bus.

12. A processing system as defined in claim 11 wherein said microprocessor is arranged for providing an upper address on said internal upper address bus and a lower address on said lower address bus, and wherein said bus interface means further comprises timing control means coupled to said internal upper and lower address busses and to said non-multiplexed and multiplexed peripheral interfaces for providing peripheral select signals to said peripheral interfaces responsive to said upper and lower addresses provided by said microprocessor.

13. A processing system as defined in claim 12 wherein said address range controller provides said multiplexer control signal to said timing control means and wherein said timing control means is coupled to said multiplexer and responsive to said multiplexer control signal for controlling the selective coupling by said multiplexer.

14. A processing system as defined in claim 13 wherein said address range controller provides said multiplexer control signal responsive to said upper address and said lower address.

15. A microprocessor as defined in claim 12 wherein said timing control means is arranged to provide said multiplexed peripheral interface with a latch enable signal for permitting said multiplexed peripheral interface to latch the address provided on said internal lower address bus when said internal lower address bus is coupled to said external address/data bus.

16. A processing system as defined in claim 12 wherein said timing control means is arranged for providing read and write control signals to said peripheral interfaces for conditioning said peripheral interfaces for a read or write access respectively by said microprocessor.

17. A processing system as defined in claim 12 wherein said microprocessor is arranged to provide said upper address on said internal upper address bus containing eight bits and said lower address on said internal lower address bus containing eight bits.

18. A bus interface for use in a processing system of the type including a processor, such as a microprocessor or a microcontroller, to configure the processor for accessing a both a non-multiplexed peripheral interface and a multiplexed peripheral interface, wherein said non-multiplexed peripheral interface includes an upper address input, a lower address input, and a data port; wherein said multiplexed peripheral interface includes a multiplexed address and data port; and wherein said processor includes an internal upper address bus; said bus interface comprising:

an external upper address bus coupled to said upper address input;

an external lower address bus coupled to said lower address input;

an external address/data bus coupled to said data port and to said multiplexed address and data port;

an address range controller, coupled to said internal upper address bus and said internal lower address bus, for providing a multiplexer control signal; and bus interface means coupled with said address range controller, said bus interface means being responsive to said multiplexer control signal for coupling, during an access to said non-multiplexed peripheral interface by said processor, said internal upper address bus to said external upper address bus, said internal lower address bus to said external lower address bus, and said internal data bus to said external address/data bus, and said bus interface means being responsive to said multiplexer control signal for first coupling, during an access to said multiplexed peripheral interface by said processor, said internal lower address bus to said external address/data bus and thereafter coupling said internal data bus to said external address/data bus.

19. A bus interface as defined in claim 18 wherein said bus interface further includes a multiplexer responsive to said multiplexer control signal for selectively coupling, during said access to said non-multiplexed peripheral interface by said processor, said internal lower address bus to said external lower address bus, and said internal data bus to said external address/data bus, and for selectively coupling, during said access to said multiplexed peripheral interface by said processor, first said internal lower address bus to said external address/data bus and thereafter said internal data bus to said external address/data bus.

20. A bus interface as defined in claim 19 wherein said processor is arranged for providing an upper address on said internal upper address bus and a lower address on said lower address bus, and wherein said bus interface means further comprises timing control means coupled to said internal upper and lower address busses and arranged to be coupled to said non-multiplexed and multiplexed peripheral interfaces and responsive to said multiplexer control signal for providing peripheral select signals to said peripheral interfaces responsive to said upper and lower addresses provided by said microprocessor.

21. A bus interface as defined in claim 20 wherein said timing control means is coupled to said multiplexer and responsive to said multiplexer control signal for controlling the selective coupling by said multiplexer.

22. A bus interface as defined in claim 20 wherein said timing control means is arranged to provide said multiplexed peripheral interface with a latch enable signal for permitting said multiplexed peripheral interface to latch the address provided on said internal lower address bus when said internal lower address bus is coupled to said external address/data bus.

23. A bus interface as defined in claim 20 wherein said timing control means is arranged for providing read or write control signals to said peripheral interfaces for conditioning said peripheral interfaces for a read or write access respectively by said processor.

24. A microprocessor as defined in claim 20 wherein said external upper address bus contains eight bits, said external lower address bus contains eight bits, and said external address/data bus contains eight bits.

* * * * *